Sept. 30, 1952      J. H. ZETTEL      2,612,462
LAMINATED INSULATING BLOCK AND METHOD OF MAKING THE SAME
Filed Nov. 20, 1947      2 SHEETS—SHEET 1
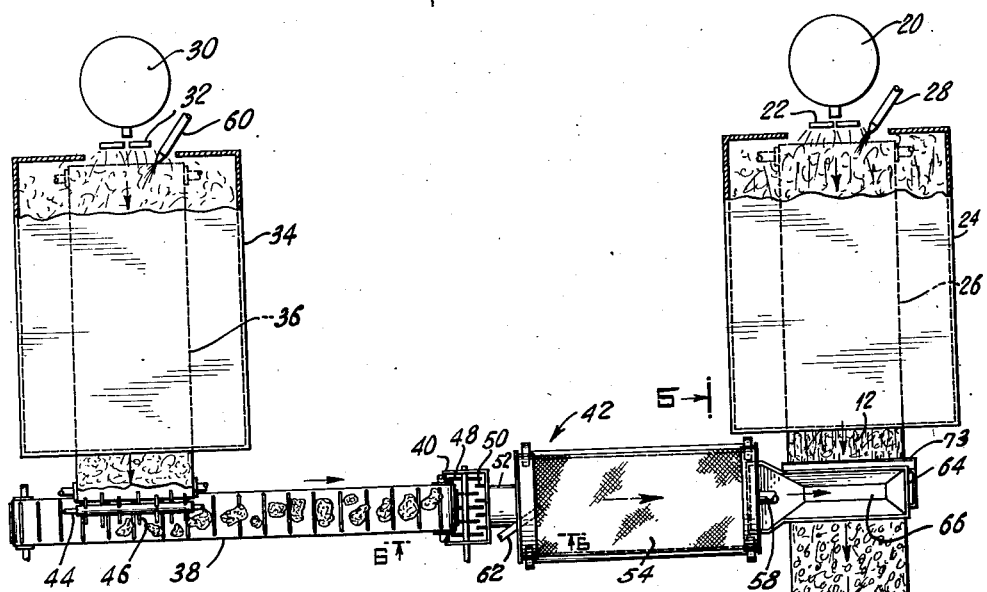
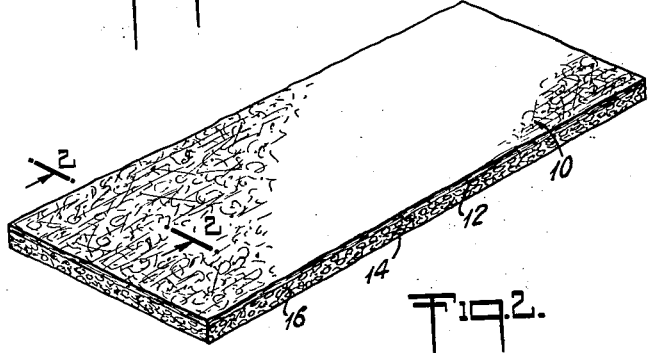
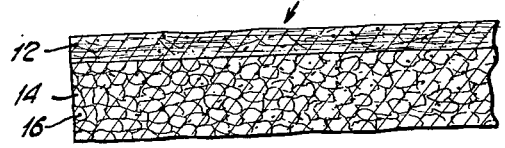
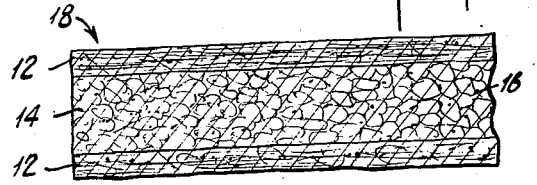
INVENTOR.
JOSEPH H. ZETTEL.
BY Virgil C. Kline
ATTORNEY.

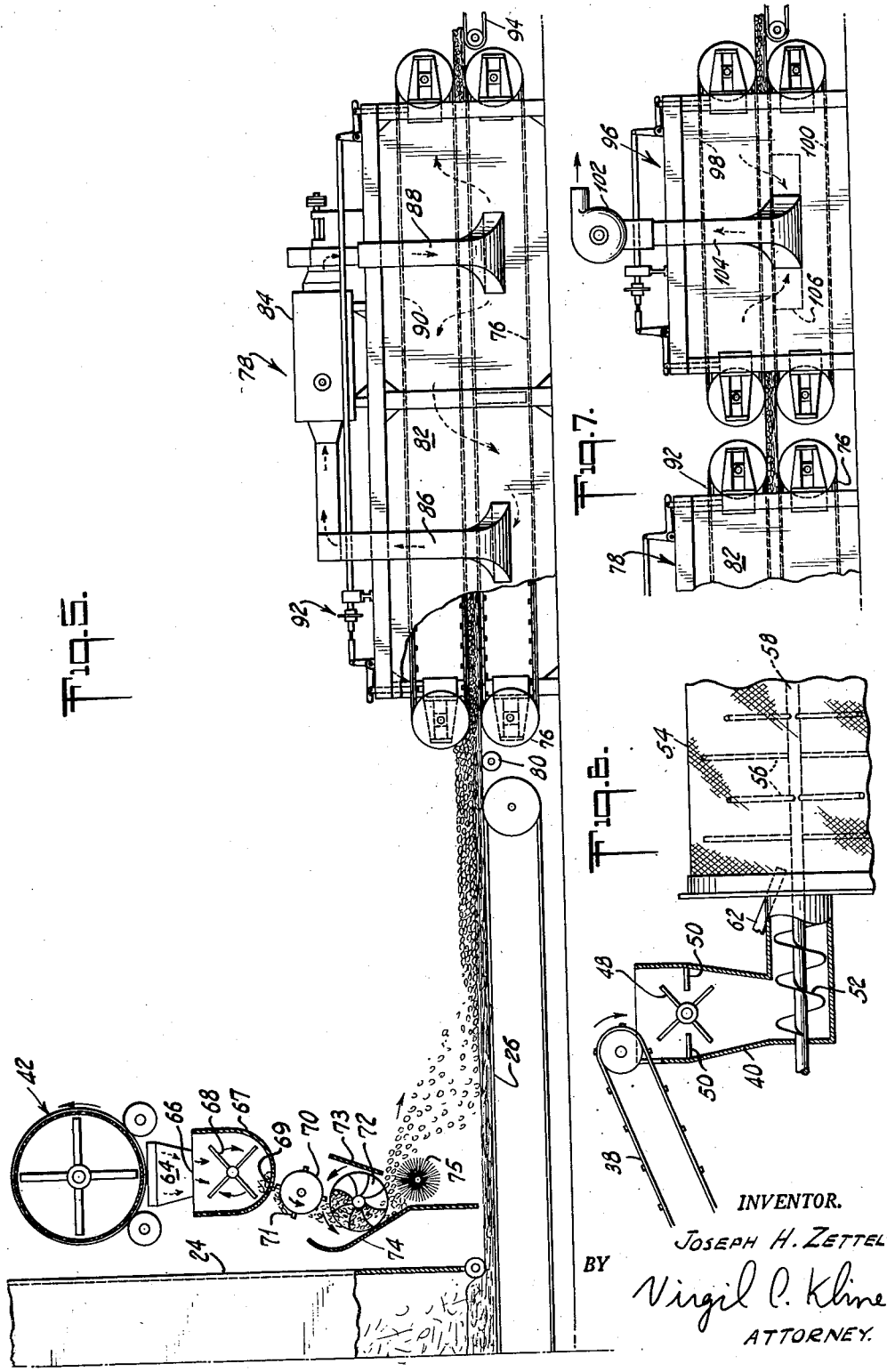

Patented Sept. 30, 1952

2,612,462

UNITED STATES PATENT OFFICE 2,612,462

LAMINATED INSULATING BLOCK AND
METHOD OF MAKING THE SAME

Joseph H. Zettel, Martinsville, N. J., assignor to
Johns-Manville Corporation, New York, N. Y.,
a corporation of New York Application November 20, 1947, Serial No. 787,082

11 Claims. (Cl. 154—28)

1

The instant invention relates to fibrous blankets and blocks and to their production, and is particularly concerned with such products formed from mineral wool and similar fibers. It will be understood that the term "mineral wool" is employed herein in a generic sense to denote fibers made from rock, slag, glass and like materials and mixtures thereof.

In the past mineral wool blankets, batts, blocks and the like have found a wide field of use in the construction and allied industries as a thermal and sound insulating media. The products have been made by different methods, the conventional method involving disintegrating a molten stream of raw material into fibers and depositing the fibers in a collecting chamber where they settle, together with a finely divided binder, onto a traveling conveyor, the fibers forming a felted structure with the binder distributed therein. The felt is then compressed to the desired density and the binder set. Inasmuch as the structural characteristics of the product are dependent upon the original felting operation in the collecting chamber where the fibers are laid in substantially stratified relationship, the product does not have either the compression or delamination-resistance required for many purposes, although the products do have high flexural strength.

A principal object of the instant invention is the provision of a product and method for producing the same, the product having both delamination-resistance and high flexural strength.

Another object of the invention is the provision of a composite product comprising a relatively high density, flexurally strong surface layer backed by a hard, compression and delamination-resistant layer of lower density, the whole being bonded into a unitary product by a binder distributed throughout the product.

Another object of the invention is the provision of such composite product comprising a layer of compressed, felted fibers and a layer of fibrous aggregates, the layers being bonded into a unitary product by a set binder distributed throughout both layers. If desired, a layer of felted fibers may overlie each face of the layer of aggregates.

In the manufacture of products in accordance with the invention, a composite body is formed of a layer of fibrous aggregates and a layer of felted fibers with a binder distributed in each layer. The composite body is then compressed and the binder set. Due to the relative compressibility of the felted material as compared to the

2 aggregates, the felted layer is compressed to a greater extent than the layer of aggregates to produce a relatively high density, flexurally strong surface backed by a compression-resistant, relatively low density layer.

A further object of the invention is the provision of a method for making products of the type referred to and more particularly to provide a method which will permit continuous operation from the raw material to the finished product.

A still further object of the invention is the provision of a method in which newly formed fibers and a finely divided binder are collected with the fibers in interfelted relationship and fibrous aggregates or bunches, preferably containing a binder, are formed at another location and distributed as a layer on the felt. In further operations the composite body is compressed and the binder set.

My invention will be more fully understood and further objects and advantages thereof will become apparent when reference is made to the more detailed description of a preferred embodiment of the invention which is to follow and to the accompanying drawings in which:

Fig. 1 is a perspective view of a product embodying the instant invention;

Fig. 2 is an enlarged, sectional view taken on the line 2—2 of Fig. 1;

Fig. 3 is a view similar to Fig. 2 illustrating a minor modification;

Fig. 4 is a diagrammatic, plan view of an apparatus employed in the instant invention for carrying out the method thereof;

Fig. 5 is an enlarged, sectional view taken on the line 5—5 of Fig. 4;

Fig. 6 is an enlarged, sectional view taken on the line 6—6 of Fig. 4; and,

Fig. 7 is a diagrammatic, elevational view illustrating a modification of the compressing and binder-setting apparatus.

Referring now to the drawings and first particularly to Figs. 1 and 2, there is shown a product 10 in block or blanket form comprising a felted layer 12 with fibers lying mostly in planes generally parallel to the faces of the layer, and a layer of fibrous aggregates 14, the fibers of both layers being preferably mineral wool or a similar material. The fibers making up layer 12 are hereinafter referred to as relatively individualized fibers to distinguish them from fibers which have been agglomerated into aggregates. Both the felted structure and the aggregates 14 are maintained under compression and the aggregates and the layers are held in intimate relationship by a hardened or set binder 16. These properties are obtained by compressing a composite made up of relatively thick layers of the two materials and maintaining the composite under compression while the binder is activated or set. As a result of the compressing operation the felted layer is relatively hard and dense due to its greater compressibility.

The aggregates, which comprise clusters or bunches of inter-entangled fibers, have the binder distributed therein, the binder serving both to adhere the fibers of the individual aggregates and to bond the aggregates together. The felted layer has the binder substantially uniformly disseminated throughout its structure. The binder is employed in only relatively minor proportions, say, proportions of 2 to 8% by weight of the product, and it will be appreciated that, although the binder is shown in the drawings as individualized particles, this is only for purposes of illustration and that in the actual product the binder will be deposited on the fibers, particularly at the crossing points, and will be visually insignificant.

The binder may be selected from those known to the art and may either be of the thermosetting or thermoplastic type, depending upon the particular characteristics desired for the finished product. For example, a thermosetting material such as a commercial phenol-formaldehyde resin, a lignin furfurol resin, glyptol resin or drying oil, or the like may be used as the binder. Suitable thermoplastic materials for the purpose are hard, pressure still residues, preferably toughened with a softer, blown or refined asphalt, gilsonite modified with a pressure still asphalt, a thermoplastic resin, or the like. Also, mixtures of any of the above thermoplastic or thermosetting materials and combinations of thermoplastic and thermosetting materials may be used to produce different effects.

The over-all density of the product, as well as the density of the individual layers, may be controlled within reasonable limits to suit particular requirements; for example, the block may have an over-all density between 8 to 30 lbs. per cu. ft. with the felted layer having substantially twice the density of the aggregate layer where a rigid, strong insulating block having a relatively hard, dense surface is required. The felted layer gives the block flexural strength and the relatively dense, penetration-resistant surface, while the aggregates particularly serve to provide compression strength and delamination-resistance.

Referring to Fig. 3 a minor modification of the product 18 is shown, the product having a relatively dense layer of felted fibers on both sides of the layer of aggregates. In this case both surfaces have penetration-resistant characteristics and flexural strength.

Referring now particularly to Figs. 4, 5, 6 and 7, there is diagrammatically shown an apparatus for carrying out the method of the instant invention. As will be understood, conventional portions of the apparatus are not shown in detail and may take different forms. The apparatus comprises a melting furnace 20 which may be a cupola, tank furnace, or the like, of any suitable construction. A raw mineral wool forming material, such as slag, rock or mixtures thereof, is melted in the furnace and discharged therefrom in position to be shredded or divided into fine individualized fibers by known fiberizing means 22. This may be either the conventional steam jet positioned to impinge on the molten stream and shred it into fibers, or may be of the rotor type diagrammatically illustrated consisting of preferably a plurality of rotors driven at high speed and adapted to receive the stream and convert it into fibers, as shown, for example, in patent to Edward R. Powell, No. 2,428,810, issued October 14, 1947. The fibers suspended in a gaseous stream set up by the steam jet, or by a gaseous draft passing around the rotors, as the case may be, are received within a collecting chamber 24. The bottom of the chamber is formed by conveyor 26, the fibers settling from the suspension onto the conveyor in the manner well known in the manufacture of mineral wool to form an inter-laced or felted structure with the fibers lying generally in planes parallel to the conveyor. Conveyor 26 is extended beyond the forward end of the collecting chamber for a purpose later to be described.

Means are provided to distribute an unset binder in the fibrous body, such means suitably consisting of a spray nozzle 28, connected to any suitable source of binder material, and adapted to introduce the binder in a finely divided state into the suspension of fibers whereby the binder settles with the fibers and becomes distributed substantially uniformly throughout the felt formed on conveyor 26. It will be appreciated that any conventional or suitable binder applying device may be used for application of either a liquid or a powdered binder as desired.

The apparatus in the preferred embodiment also includes a second melting furnace 30 and fiberizing device 32, suitably of the same construction as the furnace and fiberizing device previously referred to, the fibers formed thereby being discharged into a second collection chamber 34 having a bottom conveyor 36 to receive the fibers. Conveyor 36 projects from the forward end of the collection chamber to overlie a cross conveyor 38 adapted to travel in the direction indicated by the arrow (see Fig. 4) and having a forward, elevated end overlying a hopper 40 of a fiber nodulating or aggregating device, indicated generally at 42. Supported adjacent the forward end of conveyor 36 and above conveyor 38 is a rotatable shaft 44 driven by any suitable means (not shown), the shaft carrying a plurality of spikes or bars 46. The bars act on the fibrous body issuing from collection chamber 34 and break it up into relatively large, fibrous bunches, chunks or masses which are deposited on conveyor 38 and delivered to hopper 40.

Nodulator 42 may be of the conventional type employed in the mineral wool arts to aggregate mineral wool fibers into fibrous bunches, nodules or aggregates. This device has been diagrammatically illustrated as including a rotating rack 48 and stationary bars 50 located in hopper 40. The rotating rack is driven by any suitable means (not shown) and it cooperates with bars 50 to sub-divide the masses into smaller bunches which are discharged into the bottom of the hopper and picked up by a screw feed 52 and carried into a drum 54. The drum comprises a rotatable screen wire cage having a number of paddles 56 supported on a rotatable shaft 58. The drum and paddles are rotated in opposite directions by any suitable means (not shown). The fibrous bunches or masses discharged into the drum are further sub-divided as they travel therethrough. At the same time a substantial proportion of any unfiberized particles or shot held by the fibers is removed. It will be understood that the particular nodulating device and accessories described above are shown merely for purposes of illustration and any suitable or conventional apparatus which will convert the layer of mineral wool issuing from the collection chamber 34 into tufts, nodules or other forms of aggregates, may be substituted without departing from the scope of the invention.

Means are provided to introduce an unset binder in finely divided form into the aggregates. This means may take different forms; for example, a spray device 60 may be mounted in the end of collection chamber 34, the spray device being of similar type to that illustrated at 28 and operating in the same way to discharge a finely divided binder, which may be either a liquid or a powder, into the suspension of fibers within the collection chamber whereby the binder is distributed throughout the fibrous body formed on the floor of the collection chamber. The aggregates formed from the felt will exhibit a similar binder distribution.

Alternatively the binder, particularly where a powdered material is to be employed, may be introduced during the aggregating or nodulating operation; for example, through the medium of a delivery nozzle 62 connected to any suitable source of supply of the binder and projecting into drum 54. During the tumbling and sub-division of the fibrous bunches in the drum, the binder is discharged from the nozzle under pressure, the binder becoming intimately intermixed with the fibrous bunches to be distributed therethrough.

Drum 42 is elevated above the level of conveyor 26 and discharges the aggregates into a hopper 64, the hopper having a discharge opening 66 for discharging the aggregates into a tank 67 having paddles 68 supported for rotation in the direction indicated by the arrow. Tank 67 is provided with an outlet opening 69 in the form of a relatively narrow slot extending substantially the length of the tank. A cylindrical roll 70 is mounted below and parallel to tank 67 with its peripheral surface relatively closely adjacent the outlet opening 69, the roll being supported for rotation in the direction indicated by the arrow. Roll 70 is preferably provided with longitudinal ribs 71 to exert a pull on the material issuing from the slot of tank 67. A compartment roll 72 is supported for rotation in the direction indicated by the arrow below roll 70 and in position to receive material delivered thereby. A hopper including a front wall 73 and an elongated rear wall 74 is in position to receive material discharged by the compartment roll. Below the hopper is a brush roll 75 bearing against or substantially against the rear wall 74. The several rolls are driven by any suitable means (not shown).

The aggregates or nodules pass from drum 42 into hopper 64 and pass by gravity to tank 67 where they are kept in constant circulation by paddles 68 and forced from the tank through slot 69 to become deposited in the form of a relatively uniform layer on roll 70. The layer of aggregates is discharged from roll 70 into compartment roll 72. The fibrous aggregates are delivered by the compartment roll to the hopper defined by walls 73 and 74 where they fall onto brush roll 75 and are thrown out or scattered onto the felt carried by conveyor 26 to form a layer of relatively uniform thickness and density.

In the operation of the apparatus as thus far described and in carrying out the main steps of the method, mineral wool fibers are formed by the fiberizing devices 22 and 32 and collected in interfelted relationship on the conveyors 26 and 36 of their respective collection chambers 24 and 34. The conveyors are driven at suitable speeds commensurate with the rate of fiber production, to obtain the desired deposit of fibers. The operation of fiberizing device 32 and the associated conveyors and nodulating apparatus is preferably started somewhat earlier than in the case with fiberizing device 22 in order that aggregates will be ready for distribution on the felt issuing from blowchamber 24.

The felt containing the binder distributed therein is carried by conveyor 26 from collection chamber 24 and, as it passes beyond the brush roll 75 and associated mechanisms, a continuous layer of binder-containing aggregates is built up thereon to provide a composite body substantially thicker, say, 4 to 6 times as thick, as the final product.

Referring now particularly to Figs. 4 and 5, the further processing steps to be employed will vary depending upon the particular character of the binder used and the properties desired for the finished product. The apparatus shown in these figures is specifically adapted for the production of a product containing a thermoset binder. Conveyor 26 terminates adjacent the end of the lower conveyor belt 76 of a baking oven indicated generally at 78. A transfer roll 80 may be employed between the adjacent ends of conveyor 26 and the oven conveyor to support the fibrous body as it passes from one conveyor to the other. It will be appreciated that other conveyor arrangements may be used if desired. For example, conveyor 26 may terminate adjacent the end of the collection chamber, and oven conveyor 76 be extended to pick up the body at that point and carry it beneath the aggregate distributing device and through the oven. Also, additional processing devices may be employed between the distributing device and the oven to preliminarily treat the binder before the body passes into the oven, if desired.

Oven 78 includes a housing 82, an air heating means, such as a furnace 84, and a suitable hot air circulating system including, for example, ducts 86 and 88, whereby air heated by the furnace may be forced, preferably in a plurality of passes, through the body of fibrous material traveling through the oven. Overlying conveyor 76 is a second conveyor 90 arranged for vertical adjustment relatively to conveyor 76 by means of suitable elevating and lowering mechanism, such as that diagrammatically illustrated at 92. The conveyors are of air-pervious, open work construction to permit the heated gases to pass therethrough, but at the same time are resistant to distortion to enable the fibrous body to be compressed therebetween. For these purposes they are suitably made up of a plurality of perforated, relatively rigid flights. The oven conveyors are driven in the direction and at the same speed as conveyor 26 by any suitable means (not shown).

The body made up of the layer of felted fibers and the layer of fibrous aggregates with an unset binder distributed throughout both the felted layer and the aggregates is transferred to oven conveyor 76 and compressed between it and conveyor 90 as the body enters the oven. The upper conveyor is adjusted relatively to the lower conveyor to compress the body to substantially the thickness and density desired for the finished product. This will normally be approximately ¼ to ⅙ the original thickness of the body. The conveyors maintain the body at this thickness while the binder is subjected to setting temperatures. The selected temperature of the circulated air for this purpose will depend, of course, upon the particular binder employed and its recommended setting temperature. For example, a binder such as a phenol-formaldehyde resin, a preferred material, should be set by air at a temperature, say, of 400 to 500° F. When the body leaves the oven the binder is completely set and the body is held in its compressed, densified, relatively integrated condition. It may then be picked up on a run-off conveyor 94 and carried through a cooling zone, if desired, and to suitable apparatus for sub-dividing it into blankets, batts or blocks of the size and type desired.

The process described above may also be employed with only minor changes for the production of products incorporating a thermoplastic binder. The apparatus is the same, except that a cooling chamber 96 is employed (see Fig. 7) in line with oven 78. The cooling chamber includes an upper conveyor 98 mounted for vertical adjustment relatively to a lower conveyor 100. These conveyors are constructed of relatively rigid, perforated flights, similarly as conveyors 76 and 90. Means are provided for circulating cooling air through the chamber, such as blower 102 and duct 104 leading to a suction pan 106 beneath conveyor 100.

In carrying out the method with a thermoplastic binder, oven conveyor 90 may be adjusted relatively to conveyor 76 for full compression, as shown, or only to compress the body sufficiently to prevent its disruption by the passage of the heated air. The hot air circulation serves only to soften and fluidify the thermoplastic binder. The body with the binder in a fluid, adhesive condition then enters between conveyors 98 and 100, the distance between the conveyors having been adjusted to compress the body to substantially the thickness of the final product. As the body is carried through the chamber, air which may be either at room temperature or refrigerated, is circulated through the body by means of blower 102 to cool and harden or set the binder.

A combination of thermosetting and thermoplastic binders may also be employed, as previous plastic binders may also be employed, as previously mentioned. In this case the apparatus may be the same as when the thermosetting binder alone is used. The thermosetting component of the binder is hardened and set as the body passes through the oven and, at the same time, the thermoplastic component is fluidified. The body, after leaving the oven, is maintained in its compressed state by the thermoset material and the thermoplastic binder may be allowed to cool and harden at room temperature, or it may be cooled by passing it through a special cooling zone.

The methods described above can, with minor modifications, be employed to produce a product as described in Fig. 3, including a layer of the felted fibers on both sides of the layer of aggregates. For this purpose a fiberizing means and felting chamber may be provided at a suitable location, say, above collection chamber 24, and the felt conveyed to overlie the layer of granules before the composite body enters oven 78.

The products of the methods described above are delamination and penetration-resistant and have high flexural strength. Due to the greater compressibility of the felted material, this layer becomes relatively hard and dense. Furthermore, due to the distribution of the binder throughout both the aggregates and the felted layer, a firm bond is provided between the layers as well as between the fibers of the individual layers, and a unitary blanket or block is produced.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. A method comprising, forming a fibrous, felted layer containing a binder, forming a layer of fibrous binder containing aggregates on said felted layer, compressing the composite body thus formed, and setting the binder while the body is maintained under compression.

2. A method comprising, forming a felted layer of mineral wool fibers containing a distributed binder, distributing a layer of mineral wool aggregates on said layer to form a composite body, and subjecting said body to compression and to a binder setting operation while said body is maintained under compression.

3. A method comprising, forming a felted, fibrous layer of mineral wool fibers and a distributed binder, forming mineral wool aggregates containing a distributed binder, distributing said aggregates on said felted layer to form a composite body, compressing said body, and setting the binder while the body is maintained under compression.

4. A method comprising, forming a felted layer of mineral wool fibers and a distributed binder, forming mineral wool fibers at another location, agglomerating said mineral wool fibers at said other location into aggregates, distributing the aggregates as a layer on said felted layer to form a composite body, compressing the body and setting the binder while the body is under compression.

5. A method as defined by claim 4 including the step of distributing a binder within said aggregates prior to their distribution on the felted layer.

6. A method comprising, depositing mineral wool fibers and a finely divided binder on a conveyor to form a binder-containing felt, forming mineral wool fibers at another location, agglomerating said mineral wool fibers from said other location into aggregates and introducing a powdered binder therein, distributing said aggregates on the felted layer to form a composite body, compressing the body and setting the binder while the body is under compression.

7. A method comprising, depositing mineral wool fibers and a finely divided binder on a conveyor to form a binder-containing felt, forming a layer of mineral wool fibers at another location and distributing a binder therein, agglomerating said mineral wool fibers from said other location into aggregates, distributing the aggregates on the felted layer to form a composite body, compressing the body and setting the binder while the body is under compression.

8. A product comprising a compressed layer of mineral wool fibers in felted relationship, a layer of fibrous mineral wool aggregates in the form of closely felted nodules of interentangled fibers, and a binder distributed throughout said layers and bonding the fibers of the individual layers together, said layers being in juxtaposed relationship, one on the other, and compressed and bound together by the binder into a unitary structure.

9. A product comprising a compressed layer of relatively individualized mineral wool fibers in felted relationship, a binder distributed in said layer and bonding the fibers together, a compressed layer of lighter density than said layer of felted fibers and formed of mineral wool fiber aggregates in the form of closely felted clusters of interentangled fibers, and a binder within and between said aggregates and bonding them together, said layers being in juxtaposed relationship, one on the other, said binders retaining said layers in compressed condition and bonding them together into a unitary structure.

10. A product comprising a compressed body including a layer of relatively individualized mineral wool fibers in felted relationship, a binder distributed in said layer, a layer of lighter density than said layer of felted fibers and formed of mineral wool fiber aggregates in the form of closely felted nodules of interentangled fibers, a binder within and between said aggregates, a second layer of relatively individualized mineral wool fibers in felted relationship and a binder distributed in said second layer, said layers of relatively individualized fibers forming a sandwich with said layer of aggregates therebetween, said binders adhering the fibers of the individual layers and bonding the layers together in a compressed condition as a unitary structure.

11. A method comprising, forming a binder-containing layer of a fibrous mineral wool felted structure and a binder-containing layer of fibrous mineral wool aggregates in the form of closely felted nodules of interentangled fibers, with one layer on the other and comprising a loosely composited body, compressing said body and at least partially setting the binder, while the body is maintained under compression.

JOSEPH H. ZETTEL.

REFERENCES CITED

The following references are of record in the file of this patent:

UNITED STATES PATENTS

| Number | Name | Date |
|---|---|---|
| 291,164 | Dickman et al. | Jan. 1, 1884 |
| 683,208 | Kelly | Sept. 24, 1901 |
| 1,888,410 | Schacht | Nov. 22, 1932 |
| 1,928,699 | Neal | Oct. 3, 1933 |
| 2,087,441 | Metcalf et al. | July 20, 1937 |
| 2,217,538 | Carson | Oct. 8, 1940 |
| 2,331,145 | Slayter | Oct. 5, 1943 |
| 2,500,665 | Courtright | Mar. 14, 1950 |

FOREIGN PATENTS

| Number | Country | Date |
|---|---|---|
| 120,157 | Great Britain | Oct. 31, 1918 |